US007050895B2

(12) United States Patent
Lee et al.

(10) Patent No.: US 7,050,895 B2
(45) Date of Patent: May 23, 2006

(54) METHOD FOR MEASURING THE ABSOLUTE STEERING ANGLE OF STEERING SHAFT FOR VEHICLE

(75) Inventors: Jong-Hwa Lee, Seoul (KR); Wan-Sub Kim, Kyunggi-do (KR); Chang-Won Kang, Seoul (KR)

(73) Assignee: Hyundai Mobils, Co., Ltd., Kyunggi-do (KR)

( * ) Notice: Subject to any disclaimer, the term of this patent is extended or adjusted under 35 U.S.C. 154(b) by 183 days.

(21) Appl. No.: 10/748,152

(22) Filed: Dec. 31, 2003

(65) Prior Publication Data
US 2005/0102078 A1 May 12, 2005

(30) Foreign Application Priority Data
Nov. 11, 2003  (KR)  ........................ 10-2003-0079320

(51) Int. Cl.
*G06F 19/00* (2006.01)
(52) U.S. Cl. .................... 701/41; 180/6.2; 180/443; 280/5.51; 702/151
(58) Field of Classification Search ............ 701/41–44; 180/6.2, 6.6, 443; 280/1.202, 5.51; 475/18–19; 477/1; 702/127, 150–151
See application file for complete search history.

(56) References Cited

U.S. PATENT DOCUMENTS

| | | | |
|---|---|---|---|
| 5,930,905 A | 8/1999 | Zabler et al. | |
| 6,466,889 B1 | 10/2002 | Schodlbauer | |
| 6,848,187 B1* | 2/2005 | Ito et al. .................. | 33/1 PT |
| 6,862,551 B1* | 3/2005 | Kang et al. ............... | 702/151 |
| 6,941,241 B1* | 9/2005 | Lee et al. .................. | 702/151 |
| 2005/0102078 A1* | 5/2005 | Lee et al. .................. | 701/41 |
| 2005/0137768 A1* | 6/2005 | Lee .......................... | 701/41 |
| 2005/0159868 A1* | 7/2005 | Lee .......................... | 701/41 |

* cited by examiner

*Primary Examiner*—Yonel Beaulieu
(74) *Attorney, Agent, or Firm*—Greenblum & Bernstein, P.L.C.

(57) ABSTRACT

An absolute steering angle of a steering shaft for a vehicle is measured using rotatable bodies that rotate together with the steering shaft at respective predetermined rotation ratios. A $\Psi_M'$ value is obtained by measuring a relative rotational angle $\Psi'$ of a first rotatable body and a $\theta_M'$ value is obtained by measuring the relative rotational angle $\theta'$ of a second rotatable body. $\theta_C$'s are obtained by calculating relative rotational angles $\theta$'s of the second rotatable body corresponding to the $\Psi_M'$ value, using the relation between $\Psi'$ and $\theta'$. A frequency i-value of the first rotatable body is obtained by comparing the $\theta_C$s to the $\theta_M'$ value. An absolute steering angle $\Phi 1$ of the steering shaft is obtained based on the relation between absolute rotational angles $\Psi$ and $\Phi$, after $\Psi$ is obtained using the i-value.

5 Claims, 3 Drawing Sheets

METHOD FOR MEASURING THE ABSOLUTE STEERING ANGLE OF STEERING SHAFT FOR VEHICLE

RELATED APPLICATIONS

The present disclosure relates to subject matter contained in priority Korean Application No. 10-2003-0079320, filed on Nov. 11, 2003, which is herein expressly incorporated by reference in its entirety.

BACKGROUND OF THE INVENTION

1. Field of the Invention

The present invention relates to a method for measuring an absolute steering angle of a steering shaft for a vehicle, and more specifically, to a method for measuring an absolute steering angle of a steering shaft by using two rotatable bodies that rotate together with the steering shaft at a predetermined rotation ratio.

2. Description of the Related Art

In general, measurement of an absolute steering angle of a steering shaft using an angle sensor only is known to be difficult because the measurement range is greater than 360°.

Also the steering angle of the steering shaft should be immediately measured following start-up of a vehicle, regardless of an initial angular position. However, a prior steering angle would not be used to measure a relative change at present stage.

U.S. Pat. Nos. 5,930,905 and 6,466,889B1 disclose a method for measuring an absolute steering angle of a steering shaft based on rotational angular measurements of a first rotatable body and a second rotatable body that rotate together with a steering shaft at a predetermined rotation ratio.

In the disclosures, the absolute rotation angle of the first rotatable body and of the second rotatable body are expressed by $\Psi=\Psi'+i\Omega$ and $\theta=\theta'+j\Omega$, respectively (wherein, $\Omega$ indicates a measurement range of an angle sensor measuring the $\Psi'$ and the $\theta'$; i is a whole number representing the number of times when the first rotatable body's absolute rotation angle $\Psi$ is greater than the $\Omega$, i.e. a frequency of the first rotatable body; and j is a frequency of the second rotatable body), and the absolute steering angle, $\Phi$, can be obtained through a specific calculation procedure using measurements of $\psi'$ and $\theta'$.

According to the U.S. Pat. No. 5,930,905, the measurements of $\Psi'$ and $\theta'$ are substituted to the following equation (1), which is derived from a geometrical relation among $\Psi$, $\theta$, and $\Phi$ to get k, and by rounding off k, a whole number k is obtained. Then the k, $\Psi'$ and $\theta'$ are substituted to the following equation (2) to obtain $\Phi$.

$$k=\{(m+1)\Theta'-m\Psi'\}/\Omega \qquad \text{<Equation 1>}$$

$$\Phi=\{m\Psi'+(m+1)\Theta'-(2m+1)k\Omega\}/2n \qquad \text{<Equation 2>}$$

(Here, m indicates the number of gear teeth of the first rotatable body; m+1 indicates the number of gear teeth of the second rotatable body; and n indicates the number of gear teeth formed on the steering shaft engaged with the first and second rotatable bodies.)

On the other hand, according to the U.S. Pat. No. 6,466,889B 1, the steering angle, $\Phi$, can be obtained directly from a relation between the difference of absolute rotation angles of two rotatable bodies, $\Psi-\theta$, and 'i' of the first rotatable body (or 'j' of the second rotatable body). Here, $\Psi-\theta$ is obtained by adding $\Omega$ to a measurement of $\Psi'-\theta'$ if the measurement is a negative value, or by applying a measurement of $\Psi'-\theta'$ if the measurement is not a negative value. The 'i' is calculated from the relation between $\Psi-\theta$, and i. $\Psi$ is calculated from the known values of $\Psi'$ and i. Based on these values, the absolute steering angle of a steering shaft, $\Phi$, is obtained.

When 'i' becomes k1 as the steering shaft is fully rotated, the rotation angle difference $\Psi-\theta$ should be equal or less than the measurement range of the angle sensor, namely $\Omega$ (cf. in the U.S. Pat. No. 6,466,889B1, $\Psi-\theta$ is set to be equal to $\Omega$). In other words, the rotation angle difference $\Psi-\theta$ successively varies from 0° to $\Omega$ until the steering shaft is fully rotated, and i-value varies step by step from 0 to k1.

In particular, the U.S. Pat. No. 6,466,889B1 made an assumption that $\Psi-\theta$ and i-value are in a linearly proportional relation with each other, meaning that the value for i successively varies from 0 to k1 as the rotation angle difference $\Psi-\theta$ successively varies from 0° to $\Omega$. Also, the value of 'i' is obtained by taking a maximum whole number that is smaller than a value obtained from the multiplication of $\Psi-\theta$ measured value and k1/$\Omega$. For example, if $\psi-\theta$ times k1/$\Omega$ is 5.9, i is 5.

However, the above method poses a problem that 'i–j' has to be either 0 or 1 and should not be greater than 2 because a maximum value of $\Psi-\theta$ cannot be greater than $\Omega$.

SUMMARY OF THE INVENTION

It is, therefore, an object of the present invention to provide a method for measuring an absolute steering angle of a steering shaft rotating by more than 360 degrees, to reduce measurement errors and to simplify a calculation procedure.

Another object of the present invention is to provide a method for measuring an absolute steering angle of a steering shaft which can obtain the frequency of the first rotatable body, i, or the frequency of the second rotatable body, j, without knowing $\Psi-\theta$. After being once obtained, i or j can subsequently be obtained through a simple calculation procedure.

As for the method for measuring the steering angle of the steering shaft for a vehicle, a first rotatable body that rotates together with the steering shaft at an r1 ratio, and a second rotatable body that rotates together with the steering shaft at an r2 ratio are used.

An absolute rotational angle of the first rotatable body, $\Psi$, can be expressed as $\Psi'+i\Omega$, and an absolute rotational angle of the second rotatable body, $\theta$, can be expressed as $\theta'+i\Omega$. $\Psi'$ and $\theta'$ are measured by means of angle sensors. Here, $\Omega$ represents the measurement ranges of the angle sensors, i is a whole number that represents a frequency of the first rotatable body indicating the number of times the first rotatable body ratates over $\Omega$(for example, if $\Psi$ is 380° in the case that $\Omega$ is 180°, then i is 2), and j is a frequency of the second rotatably body. In other words, the absolute rotational angle of the first rotatable body, $\Psi$, can be expressed by $\Psi'+i\Omega$, wherein $\Psi'$ is a relative rotational angle measured by the angle sensor whose measurement range is $\Omega$. The absolute rotational angle of the second rotatable body, $\theta$, can be expressed in the same manner.

The measurement range of the angle sensor, $\Omega$, could be 180° or 360° or a different degree. Either contact angle sensors or non-contact angle sensors can be utilized as long as the angle sensors are suitable for the measurement of $\Psi'$ and $\theta'$.

In the present invention, $\Psi'$ and $\theta'$ measurements, i.e. $\Psi_M'$ and $\theta_M'$, are obtained by using the angle sensors whose measurement ranges are $\Omega$s. Then, based on a relation between $\Psi'$ and $\theta'$, a plurality of $\theta$'s corresponding to the $\Psi_M'$ is calculated to obtain their calculation values $\theta_C'$. By comparing the plurality of $\theta_C'$ to the $\theta_M'$, the frequency of the first rotatable body, i, is obtained. By using this i-value, the absolute rotational angle of the first rotatable body, $\Psi$, is obtained. Finally, the steering angle $\Phi$ (hereinafter, the resulting $\Phi$ is called $\Phi 1$) of the steering shaft is obtained from the relation between $\Psi$ and $\theta$.

Although the frequency of the first rotatable body, i, can be obtained through the above procedure every time the steering angle $\Phi$ of the steering shaft is obtained by measuring $\Psi_M'$ and $\theta_M'$, it is more preferable to utilize the already obtained i-value. That is, after comparing a present $\Psi_M'$ value to a previous $\Psi_M'$ value, and add/subtract 1 to/from a previous i-value. The reason for that is when the i-value is increased by as much as 1, the value of $\Psi_M'$ varies from $\Omega$ to 0, and when the i-value is decreased by as much as 1, the value of $\Psi_M'$ varies from 0 to $\Omega$. That is to say, $\Psi_M'$ varies a lot before and after a variation of the i-value. The above procedure is useful not only for simplifying the calculation procedure, but also for freeing the influence of a measurement error included in $\theta_M'$ upon the i-value.

More preferably, based on a relation between $\Psi'$ and $\theta'$, a plurality of $\Psi$'s corresponding to the $\theta_M'$ are calculated to obtain their calculation values $\Psi_C'$. By comparing the plurality of $\Psi_C'$s to the $\Psi_M'$, the frequency of the second rotatable body, j, is obtained. By using this j-value, the absolute rotational angle of the second rotatable body, $\theta$, is obtained. In this manner, the steering angle $\Phi$ (hereinafter, the resulting $\Phi$ is called $\Phi 2$) of the steering shaft is additionally obtained from the relation between $\theta$ and $\Psi$. Finally, the mean value of the $\Phi 1$ and the $\Phi 2$ is taken to define the steering angle, $\Phi$, of the steering shaft. By taking the mean value, the measurement errors included in $\Psi_M'$ and $\theta_M'$ can be cancelled out. In the ideal case without any measurement error, the $\Phi 1$ value and the $\Phi 2$ value are equal, but, in reality, the $\Phi 1$ value and the $\Phi 2$ value are not equal.

Similar to the above-described method for obtaining an i-value, it is more preferable to get a present j-value by adding/subtracting 1 to/from a previous j-value based on a comparison of a previous $\theta_M'$ value to a present $\theta_M'$ value. If the resulting $\Phi 1$ value and the $\Phi 2$ value are too much different from each other, $\Psi_C'$ and $\theta_C'$ are recalculated, and $\Psi_M'$ and $\theta_M'$ are compared again to get a new i-value and a new j-value again.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
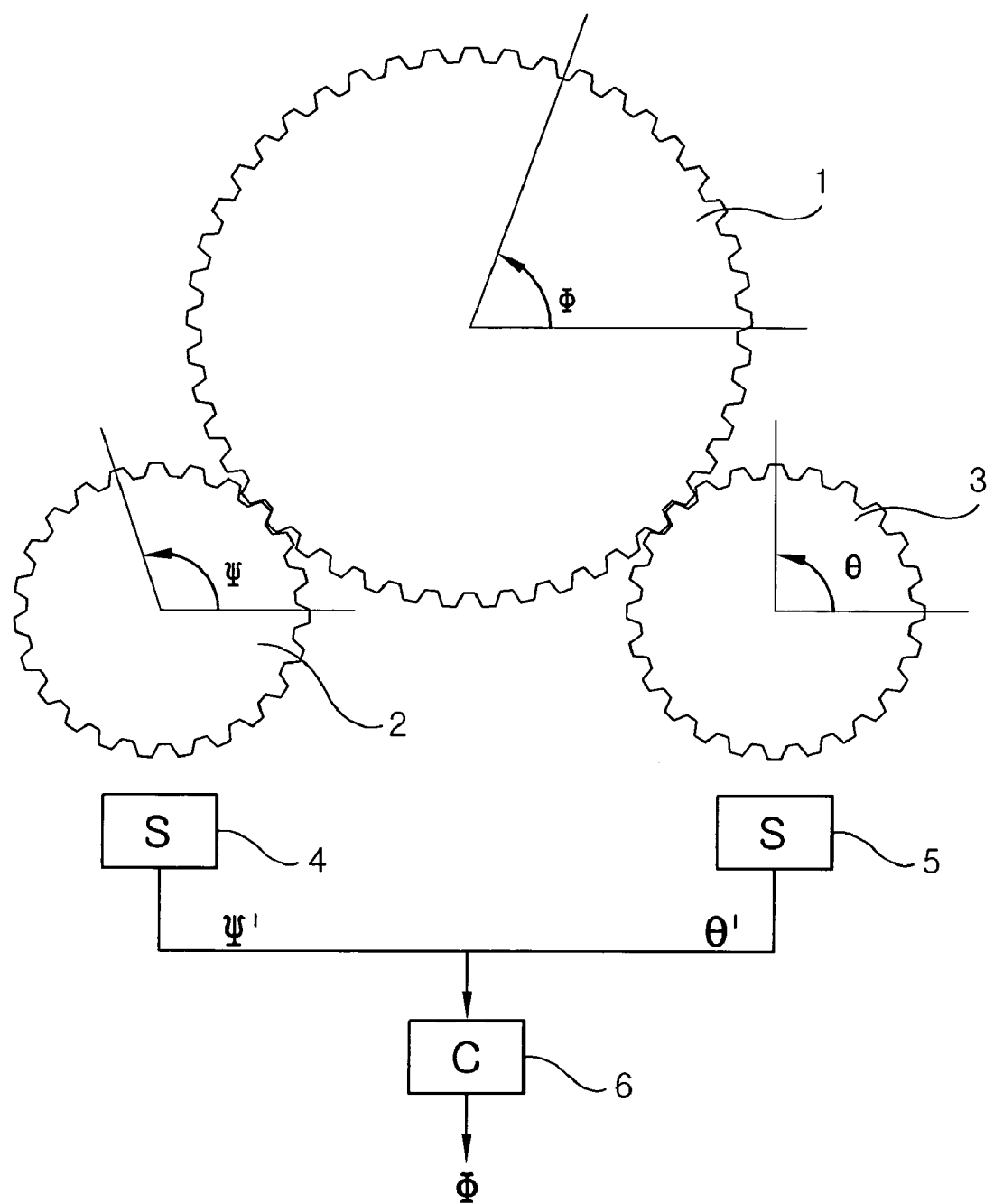
FIG. 1 illustrates a preferred embodiment of the present invention.
Figure 2:
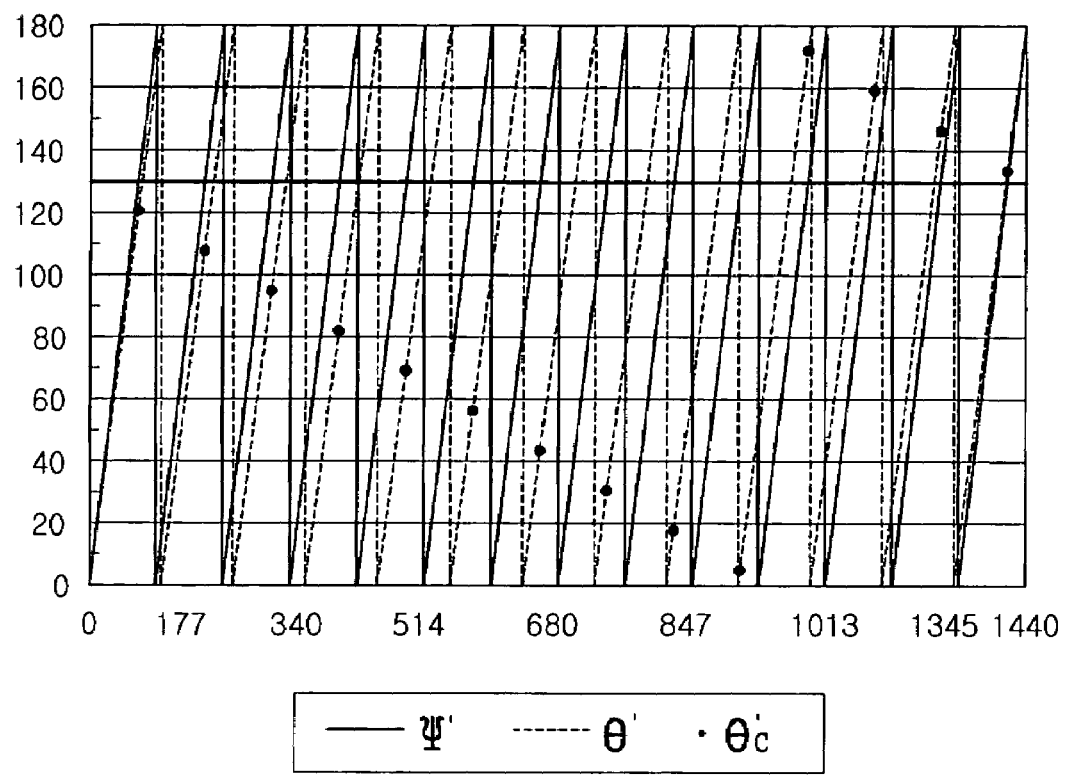
FIG. 2 graphically illustrates a relation between $\Psi'$ and $\theta'$ in accordance with a steering angle of a steering shaft.
Figure 3:
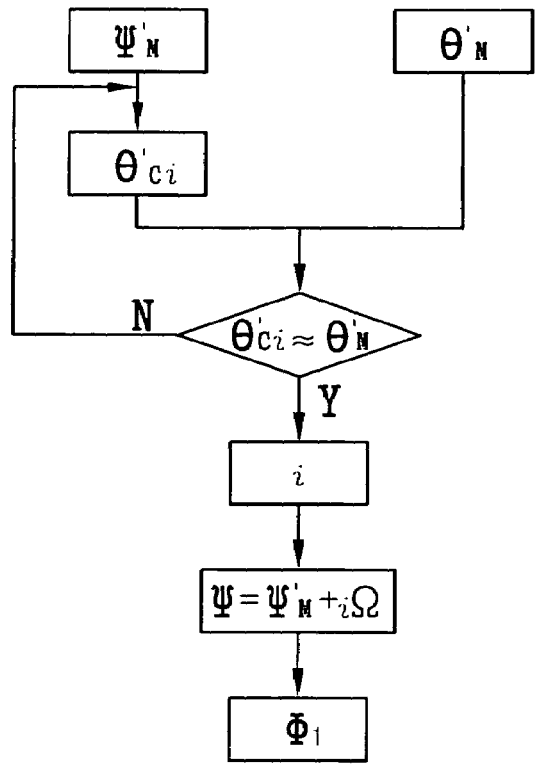
FIG. 3 illustrates a calculation procedure to obtain $\phi 1$ according to the present invention.

FIG. 1 shows a first rotatable body 2 and a second rotatable body 3 being engaged with a steering shaft 1, angle sensors 4 and 5 for measuring relative rotation angles $\Psi'$ and $\theta'$ of the first and second rotatable bodies, and an operational circuit 6 for conducting a designated operation using $\Psi'_M$ and $\theta'_M$ measurements provided by the sensors 4 and 5 and for outputting a resulting $\Phi$. Here, a rotation ratio (r1) of the steering shaft to the first rotatable body is 7/4, and a rotation ratio (r2) of the steering shaft to the second rotatable body is 6.5/4 (the numbers of the teeth of the gears represented in FIG. 1 may not be correct). FIG. 2 graphically shows a relation between a relative rotation angle ($\Psi'$) of the first rotatable body and a relative rotation angle ($\theta'$) of the second rotatable body during 4 rotations of the steering shaft. In FIG. 2, x-axis denotes the steering angle $\Phi$, and $\Omega$ is 180°. FIG. 3 illustrates a calculation procedure for obtaining an absolute steering angle, $\Phi$, of a steering shaft, based on measurements of the $\Psi'$ and the $\theta'$.

Preferably, the relation between the relative rotation angles of the first and second rotatable bodies is obtained experimentally by measuring the relative rotation angle ($\psi'$) of the first rotatable body and the relative rotation angle ($\theta'$) of the second rotatable body, as varing the steering angle of the steering shaft.

As shown in FIG. 3, $\psi_M'$ and $\theta'_M$ are measured by angle sensors. Then by taking advantage of the relation shown FIG. 2, a plurality of $\theta_C$'s corresponding the $\psi_M'$ are calculated ($\theta_C i'$ in FIG. 3 indicates $\theta_C'$ corresponding to 'i'). Then the closest value among the $\theta_C$'s to $\theta_M'$ is found to get i. For instance, suppose that $\Psi_M'=130°$, and $\theta'_{=105}°$. As shown on the graph of FIG. 2, when $\Psi'=130°$, its corresponding $\theta_C$'s, given that i ranges from 0 to 13, are 120.7°, 107.9°, 95°, 82.1°, 69.3°, 56.4°, 43.6°, 30.7°, 17.9°, 5°, 172.1°, 159.3°, 146.4°, and 133.6°, successively. Among these values for $\theta_C$'s, 107.9° is the closest to the $\theta_M$'s, which is 105°, so the corresponding i becomes 1.

Using the known i-value and $\Psi_M'$ values, the steering angle, $\Phi 1$, of the steering shaft can be calculated applying the following equation 5.

$$\Phi 1 = 1/r1 \ (\Psi_M' + i\Omega) = 4/7(130°+180°) = 177°. \qquad \text{<Equation 5>}$$

Although the 'i' value can be obtained using the above equation every time, it is more preferable to utilize the already obtained i-value. That is, after comparing a present $\Psi_M'$ value to a previous $\Psi_M'$ value, and add/subtract 1 to/from a previous i-value. For example, if $\Delta\Psi_M'$ (i.e. the present $\Psi_M'$ value–the previous $\Psi_M'$ value) is smaller than a predetermined negative value, add 1 to the previous i-value, and if $\Delta\Psi_M'$ is larger than the predetermined positive value, subtract 1 from the previous i-value, if $\Delta\Psi_M'$ belongs to neither case, the previous i-value is kept as the present i-value.

Figure 4:
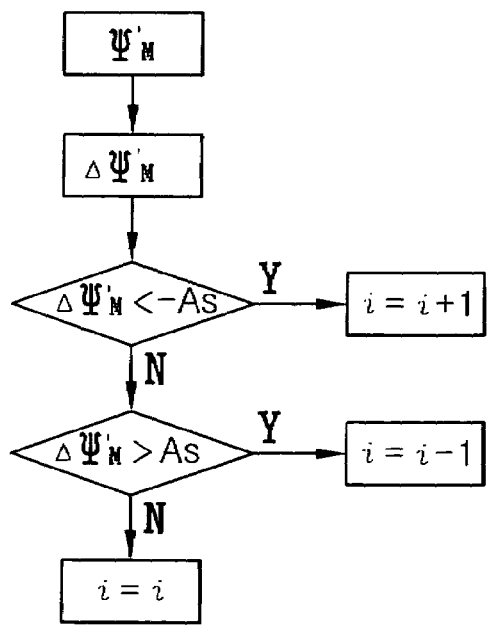
FIG. 4 illustrates a simplified calculation procedure for obtaining 'i' according to the present invention.

The above procedure is well illustrated in FIG. 4. As shown in FIG. 4, if $\Delta\Psi_M'$ is smaller than a determined value, say,—As, 1 is added to the previous i-value, and if $\Delta\Psi_M'$ is larger than As, 1 is subtracted from the previous i-value, and in neither case, the present i-value maintains as the present i-value. For instance, suppose that the previous i-value is 3, the specific value As is 170°, the previous $\Psi_M'$ value is 179°, and the present $\Psi_M'$ value is 1°. Then the $\Delta\Psi_M'$ equals to −178°, which is smaller than −170°, so the present i-value becomes 4. On the other hand, if the previous $\Psi_M'$ value is 1° and the present $\Psi_M'$ value is 179°, the $\Delta\Psi_M'$ equals to 178°, which is larger so the present i-value becomes 2.

Once the present i-value is obtained, the resulting i-value and the present $\Psi_M{}'$ value are substituted to the equation 5 to obtain the present $\Phi 1$.

Similar to the method for obtaining the i-value by calculating the plurality of $\theta_C$'s from the $\Psi_M{}'$ value, the j-value also can be obtained by calculating the plurality of $\Psi_C$'s from the $\theta_M{}'$, and the present j-value can be obtained by comparing the present $\theta_M{}'$ value to the previous $\theta_M{}'$ value. Using these known values, the steering angle, $\Phi 2$, of the steering shaft can be obtained applying the following equation 6.

$$\Phi 2 = 1/r2(\Theta_M{}' + j\Omega) \qquad \text{<Equation 6>}$$

More preferably, the mean value of the $\Phi 1$ and $\Phi 2$ is used for the steering angle of the steering shaft. In this manner, it is possible to minimize measurement errors in $\Psi_M{}'$ and $\theta_M{}'$ values.

When the difference between $\Phi 1$ and $\Phi 2$ is so large that it is greater than a specific value, that means that measurement error exceeds an allowable limit. Therefore, the i-value and the j-value should be recalculated through the procedure shown in FIG. 3 to get new $\Phi 1$ and $\Phi 2$, and the mean value of $\Phi 1$ and $\Phi 2$ is obtained therefrom.

In conclusion, according to the present invention, the steering angle can be obtained directly from the i-value and the j-value, without using $\Psi$–$\theta$. Once the i-value and the j-value are obtained, the following calculation procedure is much simplified.

In other words, once the i-value is obtained, a successive i-value can be obtained simply by comparing the present $\Psi_M{}'$ value to the previous $\Psi_M{}'$ value. More importantly, the i-value is not under the influence of measurement error included in the $\theta_M{}'$ value. Moreover, once the i-value is obtained, although the $\theta_M{}'$ value may not be measured because of a mechanical trouble in the angle sensor, the steering angle for the steering shaft can still be measured.

In addition, the present invention can reduce calculation errors found in rounding off steps to define the absolute steering angle (e.g., rounding off 'k'-value in U.S. Pat. No. 5,930,905 or rounding off an 'i'-value in U.S. Pat. No. 6,466,889B1). That is, the present invention can resolve a serious error (±1) in the rounding off of the absolute steering angle.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for measuring an absolute steering angle of a steering shaft for a vehicle using a first rotatable body and a second rotatable body that rotate together with the steering shaft of the vehicle at a predetermined rotation ratio, respectively, the method comprising:

obtaining a $\Psi_M{}'$ value by measuring a relative rotational angle $\Psi'$ of the first rotatable body and obtaining a $\theta_M{}'$ value by measuring the relative rotational angle $\theta'$ of the second rotatable body, using angle sensors having measurement ranges of $\Omega$;

obtaining $\theta_C$'s by calculating a plurality of relative rotational angles $\theta$'s of the second rotatable body corresponding to the $\Psi_M{}'$ value, using the relation between the relative rotational angle $\Psi'$ of the first rotatable body and the relative rotational angle $\theta'$ of the second rotatable body;

obtaining a frequency i-value of the first rotatable body by comparing the plurality of $\theta_C$'s to the $\theta_M{}'$ value; and obtaining an absolute steering angle $\Phi 1$ of the steering shaft based on the relation between $\Psi$ and $\Phi$, after the absolute rotational angle $\Psi$ is obtained by using the i-value.

2. The method according to claim 1, further comprising: obtaining a present i-value by comparing a previous $\Psi_M{}'$ value to a present $\Psi_M{}'$ value, obtaining a present value for the absolute rotational angle $\Psi$ of the first rotatable body, and obtaining a present $\Phi 1$ value, which is a successive value of the $\Phi 1$ measurement, based on the relation between $\Psi$ and $\Phi$.

3. The method according to claim 1, further comprising:

obtaining a plurality of $\Psi_C{}'$ values by calculating a plurality of $\Psi'$ values corresponding to the $\theta_M{}'$ value using the relation between the $\Psi'$ values and the $\theta'$ values;

obtaining a frequency j of the second rotatable body by comparing the plurality of $\Psi_C{}'$ values to the $\Psi_M{}'$ value;

obtaining an absolute steering angle $\Phi 2$ of the steering shaft based on the relation between $\theta$ and $\Phi$, wherein the absolute rotational angle $\theta$ of the second rotatable body is obtained by using the j-value; and obtaining the steering angle $\Phi$ of the steering shaft by taking the mean value of the $\Phi 1$ and the $\Phi 2$.

4. The method according to claim 3, further comprising:

obtaining a present i-value from a previous i-value after comparing a previous $\Psi_M{}'$ value to a present $\Psi_M{}'$ value, obtaining a present value for the absolute rotational angle $\Psi$ from the obtained present i-value, and obtaining a present $\Phi 1$ value from a relation between $\Psi$ and $\Phi$;

obtaining a present j-value from a previous j-value after comparing a previous $\theta_M{}'$ value to a present $\theta_M{}'$ value, obtaining a present value for the absolute rotational angle $\theta$ from the obtained present j-value, and obtaining a present $\Phi 2$ value from a relation between $\theta$ and $\Phi$; and taking the mean value of the present $\Phi 1$ value and the present $\Phi 2$ value.

5. The method according to claim 4, wherein if a difference between the $\Phi 1$ value and the $\Phi 2$ value, $\Delta\Phi$, is greater than a predetermined value, further comprising:

reobtaining the i-value of the first rotatable body by comparing a plurality of $\theta_C{}'$ values to a $\theta_M{}'$ value, in which the plurality of $\theta_C{}'$ values are obtained by calculating a plurality of $\theta$'s corresponding to a $\Psi_M{}'$ value based on the relation between the $\theta'$ and the $\Psi'$;

reobtaining a j-value of a second rotatable body by comparing a plurality of $\Psi_C{}'$ values to a $\Psi_M{}'$ value, in which the plurality of $\Psi_C{}'$ values are obtained by calculating a plurality of $\Psi$'s corresponding to a $\theta_M{}'$ value based on the relation between the $\theta'$ and the $\Psi'$; and taking the mean value of recalculated $\Phi 1$ and $\Phi 2$ values by using the reobtained i-value and the j-value.

* * * * *

UNITED STATES PATENT AND TRADEMARK OFFICE
CERTIFICATE OF CORRECTION

PATENT NO. : 7,050,895 B2
APPLICATION NO. : 10/748152
DATED : May 23, 2006
INVENTOR(S) : J. H. Lee et al.

It is certified that error appears in the above-identified patent and that said Letters Patent is hereby corrected as shown below:

On the cover page, at Item (73), Assignee, "Mobils" should be --Mobis--.

Signed and Sealed this

Ninth Day of January, 2007

JON W. DUDAS
*Director of the United States Patent and Trademark Office*